United States Patent [19]

Suzuki

[11] Patent Number: 4,479,681
[45] Date of Patent: Oct. 30, 1984

[54] TRACK GUIDE BEARING ASSEMBLY
[75] Inventor: Masayuki Suzuki, Maebashi, Japan
[73] Assignee: Nippon Seiko Kabushiki Kaisha, Tokyo, Japan
[21] Appl. No.: 515,102
[22] Filed: Jul. 19, 1983
[30] Foreign Application Priority Data Jul. 24, 1982 [JP] Japan ............................ 57-111608[U]

[51] Int. Cl.³ ........................ F16C 29/06; F16C 27/00
[52] U.S. Cl. .................................. 308/5 R; 308/6 C; 384/99
[58] Field of Search .............. 308/5 R, 6 C, 6 R, 3 A; 384/99, 101

[56] References Cited

U.S. PATENT DOCUMENTS 4,080,009  3/1978  Marathe et al. ................. 308/5 R
4,422,779 12/1983  Hamaekers et al. ............... 384/99
4,428,627  1/1984  Teramachi ....................... 308/6 C
4,441,765  4/1984  Kasai et al. ..................... 308/6 C Primary Examiner—Lenard A. Footland
Attorney, Agent, or Firm—Fitzpatrick, Cella, Harper & Scinto

[57] ABSTRACT

A track guide bearing assembly comprises a long track shaft having a plurality of rolling grooves formed axially thereof, a slidable bed having rolling grooves opposed to the rolling grooves of the track shaft in the inner surface of an axial recess for receiving the track shaft therein, a number of balls disposed for rolling between the mutually opposed rolling grooves of the slidable bed and the track shaft, a saddle member placed on the slidable bed, a liquid passage for supplying a pressurized fluid between the saddle member and the slidable bed, and means for floatingly supporting the saddle member in the fashion of static pressure disposed between the saddle member and the slidable bed.

4 Claims, 2 Drawing Figures

TRACK GUIDE BEARING ASSEMBLY

BACKGROUND OF THE INVENTION

1. Field of the Invention

This invention relates to a track guide bearing assembly having a slidable bed put on a long track shaft with rolling members interposed therebetween and movable axially thereof.

2. Description of the Prior Art

In such a track guide bearing, balls are generally used as rolling elements and the slidable bed is supported through the rolling of the balls and therefore, as compared with the conventional slide guide, sliding resistance is very small, and the balls are disposed in ball rolling grooves, and this leads to the advantage that load capacity is great as compared with the conventional linear ball guide.

However, such a track guide bearing assembly is adapted to be used with the slidable bed fixed directly to a table which is a movable member, and this has led to a disadvantage that the attenuation characteristic relative to the vibration of the table is poor.

To overcome such disadvantage, it would occur to mind to provide a static pressure guide in parallelism to the direction of guide of the track shaft to thereby attenuate the vibration, but the provision of such a static pressure guide would lead to complication of the device and a disadvantage that the attenuation effect in the direction of movement of the table is not good.

SUMMARY OF THE INVENTION

It is an object of the present invention to eliminate the above-noted disadvantages peculiar to the track guide bearing assembly according to the prior art and to provide a track guide bearing assembly having attenuating means for attenuating the vibrations in any and all directions.

To achieve such object, according to the present invention, an outwardly projecting projection is provided on a slidable bed, a saddle member provided with a recessed portion for loosely fitting on the projection of the slidable bed is put on the slidable bed, and pressurized liquid is supplied between the projection of the slidable bed and the recessed portion of the saddle member to support the saddle member by a static pressure.

The invention will become more fully apparent from the following detailed description thereof taken in conjunction with the accompanying drawings.

DESCRIPTION OF THE PREFERRED EMBODIMENT

Figure 1:
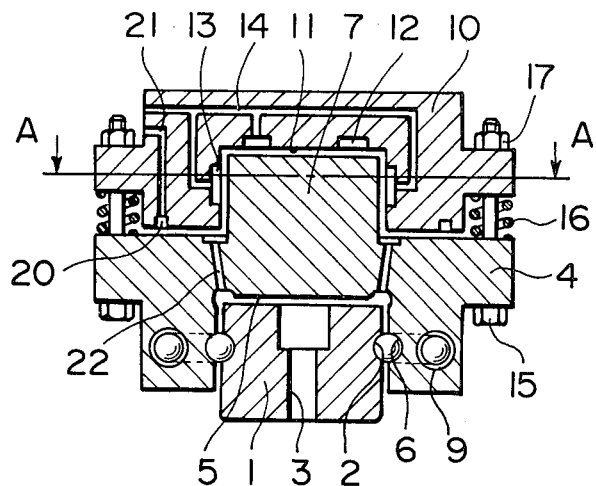
FIG. 1 is a transverse cross-sectional view showing an embodiment of the track guide bearing assembly according to the present invention.
Figure 2:
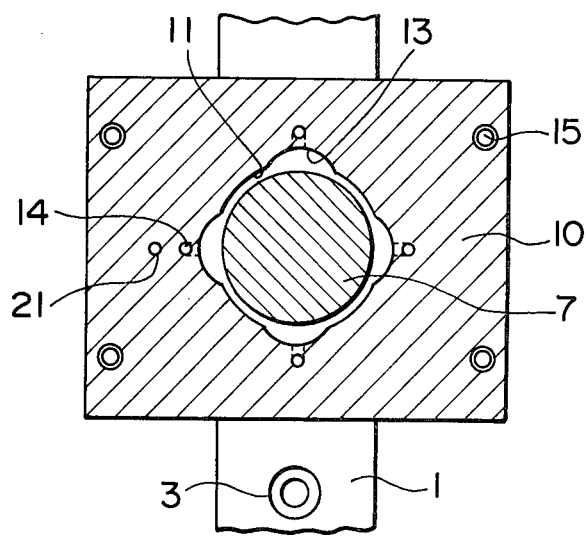
FIG. 2 is a cross-sectional view taken along the line A—A of FIG. 1.

An embodiment of the present invention will hereinafter be described with reference to FIGS. 1 and 2.

A track shaft 1 is a long shaft of rectangular cross-sectional shape formed with axial ball rolling grooves 2 in the opposite sides thereof. A bolt hold 3 is a hole used when the track shaft 1 is mounted.

A slidable bed 4 has an axial recess 5 for receiving the track shaft 1, and ball rolling grooves 6 opposed to the ball rolling grooves 2 of the track shaft are formed in the opposite sides of the recess 5. An outwardly projecting pillar-like projection 7 is provided on that surface of the slidable bed 1 which is opposite to the recess 5 of the slidable bed.

A number of balls 8 are disposed for rolling between the ball rolling grooves 2 of the track shaft and the ball rolling grooves 6 of the slidable bed, and the slidable bed 4 is put on the track shaft 1 with the balls 8 interposed therebetween.

Ball passages 9 for circulating the balls 8 therein are formed rearwardly of the ball rolling grooves 6 of the slidable bed, and the balls 8 may be guided and circulated in the ball passages 9 by ball guide means provided at the ends of the slidable bed 4. With such construction, the slidable bed 4 may be guided by the track shaft 1 and is axially movable through the rolling of the balls.

A saddle member 10 has a recess 11 to fit loosely on the projection 7 of the slidable bed and is put on the slidable bed 4. A circumferential groove 12 is formed in the button portion of the inner surface of the recess 11 of the saddle member, and four crescent-shaped pockets 13 are equidistantly formed in the side wall of the recess 11. The circumferential groove 12 and pockets 13 are in communication with a fluid passage 14 formed in the saddle member 10 so that by pressurized lubricating oil being supplied to the fluid passage 14, the space between the projection 7 of the slidable bed and the recess 11 of the saddle member is filled up with fluid, whereby a static pressure bearing may be formed between the slidable bed 4 and the saddle member 10.

The slidable bed 4 and the saddle member 10 are formed with concentric through-holes at the four corners thereof, and bolts 15 are inserted in these through-holes. Springs 16 inserted over the bolts 15 are disposed between the slidable bed 4 and the saddle member 10, to bias the saddle member 10 away from the slidable bed 4. A nut 17 is threadably engaged with the thread on the end portion of each bolt 15, and the saddle member 10, biased away from the slidable bed 4 by the springs 16, is held at a position spaced apart by a predetermined distance from the slidable bed 4.

A circumferential groove 20 provided in the underside of the saddle member 10 is in communication with a gas passage 21 formed in the saddle member 10. This groove 20 is for pressurized air supplied to the gas passage 21 to surround said static pressure bearing and prevent liquid leakage from the static pressure bearing.

Holes 22 opening from the upper surface of the slidable bed 4 and the corners of the projection 7 into the inner surface of the recess 5 are adapted to guide part of the pressurized liquid to the ball rolling grooves 2 and 6. This enables the balls 8 also to be lubricated by the lubricating oil used as the liquid for the static pressure bearing. However, other material than the lubricating oil can also be used as the liquid used for the static pressure bearing and in such case, the holes 22 need not be provided and the liquid can be recovered separately.

When pressurized liquid is supplied to the fluid passage 14, the saddle member 10 is supported by the slidable bed 4 through the static pressure bearing of the crescent-shaped pockets 13 of the projection 7 provided in the axial direction of the track shaft 1 and the direction orthogonal thereto, and in the vertical direction, a load acting from above to below is supported by the static pressure bearing of the circumferential groove 12 and the springs 16 and acts from below to above.

The force in the direction of floating is adapted to be supported by the bolts 15.

The bolts 15 are lateral relative to the displacement of the saddle member 10 in the axial direction of the track shaft 1 and the horizontal direction perpendicular thereto and therefore do not exhibit high rigidity.

In this embodiment, the projection 7 is projected outwardly of the slidable bed 4, but of course, the projection 7 may also be formed discretely from the slidable bed 4 and fixed thereto by fixing means.

In the track guide bearing assembly of the present invention constructed as described above, the saddle member is supported relative to the slidable bed of the track guide bearing with liquid interposed therebetween and therefore, any vibration exerted on the saddle member can be effectively absorbed and the tottering resulting from vibration can be reduced even during sudden start or sudden stoppage of the table of a machine tool, a measuring machine or the like.

In the direction of floating, the saddle member 10 is supported by the bolts 15 and has great rigidity, but when the saddle member 10 is displaced vertically downwardly, it receives the attenuation of the static pressure bearing and therefore practically sufficient attenuation can be obtained.

I claim:

1. A track guide bearing assembly comprising a long track shaft having a plurality of rolling grooves formed axially thereof, a slidable bed having rolling grooves opposed to said rolling grooves of said track shaft in the inner surface of an axial recess for receiving said track shaft therein, a number of rolling members disposed for rolling between the mutually opposed rolling grooves of said slidable bed and said track shaft, a saddle member placed on said slidable bed, a liquid passage for supplying a pressurized fluid between said saddle member and said slidable bed, and means for floatingly supporting said saddle member in the fashion of static pressure disposed between said saddle member and said slidable bed.

2. A track guide bearing assembly according to claim 1, wherein said means for floatingly supporting said saddle member includes a recessed portion formed on that side of said slidable bed opposite to said recess, and a recessed portion formed in said saddle member so as to loosely fit in said recessed portion.

3. A track guide bearing assembly according to claim 1, further comprising means for biasing said saddle member away from said slidable bed, and means for holding said slidable bed and said saddle member at a predetermined distance.

4. A track guide bearing assembly according to claim 1, further comprising means for guiding the pressurized fluid supplied to the recessed portion of said saddle member and the recessed portion of said slidable bed, to lubricate said rolling members.

* * * * *